June 18, 1957     J. E. KRIEBEL, JR     2,796,254
SPRING COVER

Filed June 29, 1953     2 Sheets-Sheet 1

INVENTOR.
John E. Kriebel, Jr.
BY
ATTORNEY

June 18, 1957 J. E. KRIEBEL, JR 2,796,254
SPRING COVER
Filed June 29, 1953 2 Sheets-Sheet 2
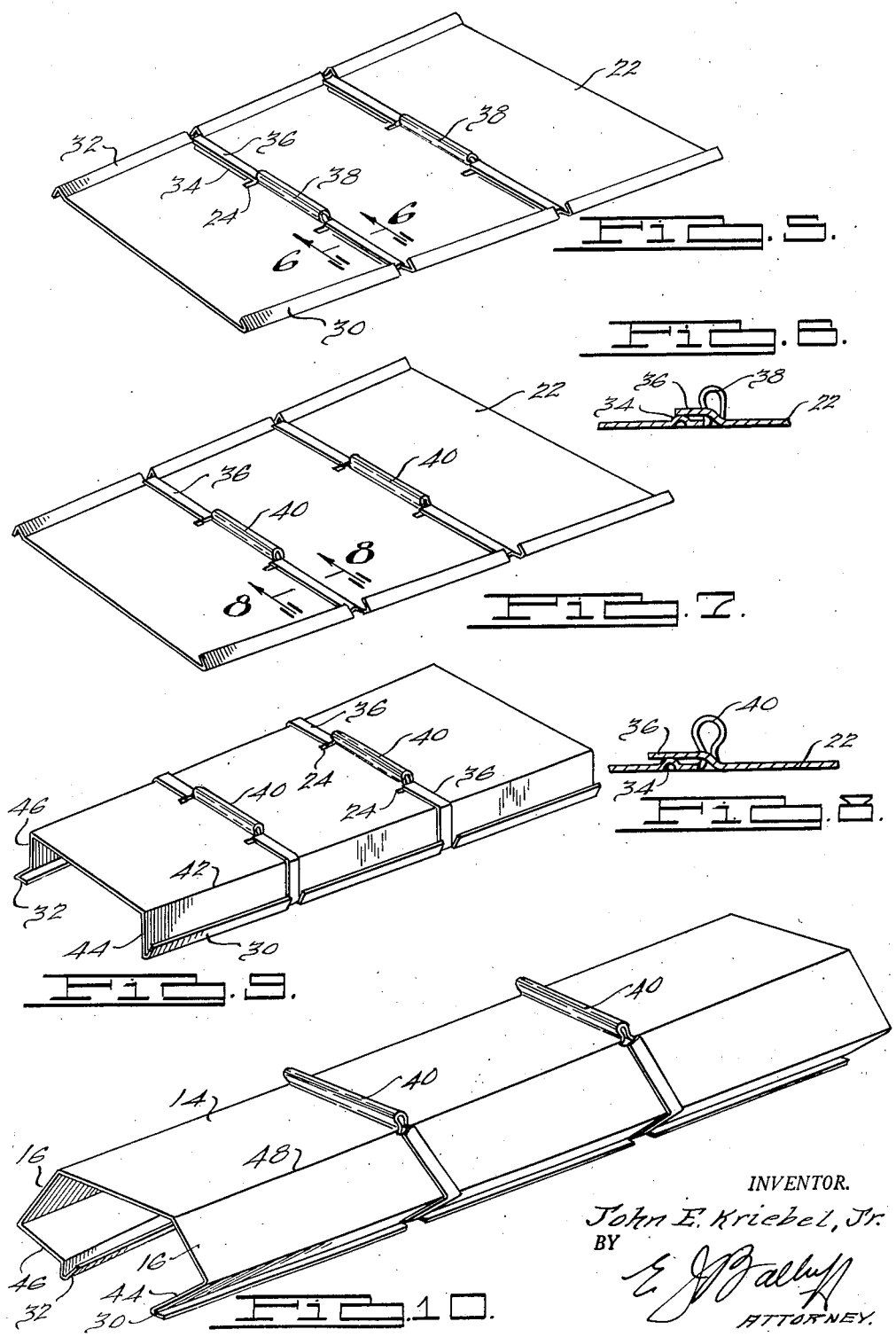
INVENTOR.
John E. Kriebel, Jr.
BY
ATTORNEY.

United States Patent Office 2,796,254
Patented June 18, 1957

2,796,254

SPRING COVER

John E. Kriebel, Jr., Milford, Mich., assignor, by mesne assignments, to Spring Cover Manufacturing Company, Inc., Detroit, Mich., a corporation of Michigan Application June 29, 1953, Serial No. 364,859

1 Claim. (Cl. 267—37)

This invention relates to casings or covers for vehicle leaf springs and has particular reference to a one-piece spring cover and a method of making the same.

Spring covers are commonly used with the laminated spring assemblies of automotive vehicles for the purpose of protecting the springs from moisture and dirt and to retain lubricant in contact with the springs, while permitting flexing of the spring under varying load conditions. The present invention is concerned with a one-piece spring cover of improved construction which efficiently protects the springs on which it is used from moisture and dirt, and which is readily adapted to mass production techniques so as to substantially reduce the cost thereof.

A principal object of the invention is to provide a new and improved spring cover for leaf springs.

A further object of the invention is to provide a flexible one-piece spring cover which is particularly suited for mass production technique.

Another object of the invention is to provide a new and improved method of making a spring cover.

A further object of the invention is to provide a one-piece flexible spring cover which permits both flexing and longitudinal shifting of different portions of the cover relative to each other.

Other and further objects of the invention will be apparent from the following description and claim and will be understood by reference to the accompanying drawings, of which there are two sheets, which by way of illustration show a preferred embodiment of the invention and what I now consider to be the best mode in which I have contemplated applying the principles of my invention. Other embodiments of the invention may be used without departing from the scope of the present invention as set forth in the appended claim.

In the drawings:

Fig. 5 is a perspective view showing the next step in the method of producing the cover.

Fig. 6 is a sectional view taken on line 6—6 of Fig. 5.

Fig. 7 is a perspective view showing the succeeding step in the method of making the cover.

Fig. 8 is a sectional view taken on line 8—8 of Fig. 7.

Fig. 9 is a perspective view of the succeeding operation.

Fig. 10 is a perspective view of the completed cover prior to its assembly onto the leaf spring.

Figure 1:
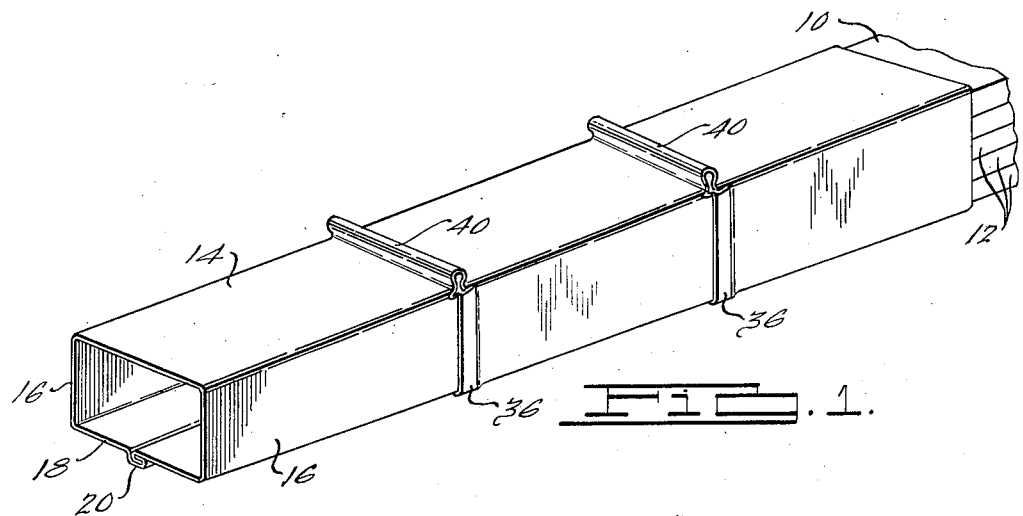
Fig. 1 is a perspective view of a spring cover embodying my invention applied to a vehicle spring.

Referring more particularly to the drawings, the spring cover of this invention is particularly suited for use with a vehicle spring 10 comprising a plurality of spring leaves 12, a portion of which is shown in Fig. 1. The casing when completed comprises a top wall 14, side walls 16, and a bottom wall 18 adapted to enclose the spring and to be locked in position thereon by any suitable means, in the present instance a lock seam 20 to be more fully described hereinafter.

Figure 2:
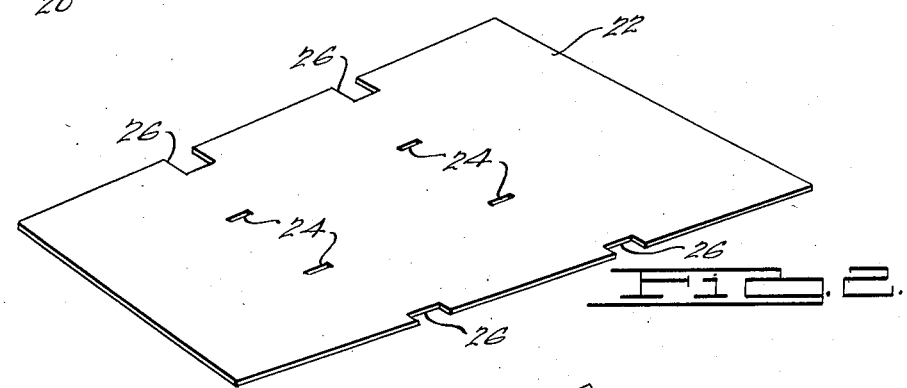
Fig. 2 is a perspective view of a sheet metal blank from which the cover is made and showing one step in the production of the cover.

Each casing may be stamped from a single sheet metal blank as shown in the drawings, or the covers may be successively stamped and severed from a continuous strip of sheet metal. The sheet metal blank 22 from which the spring cover is made may be slotted as at 24, the slots being arranged in transversely aligned pairs of slots with each pair longitudinally spaced from the other pairs of slots as shown in Fig. 2. The side edges of the blank 22 are notched at 26 opposite each aperture 24.

Figure 3:
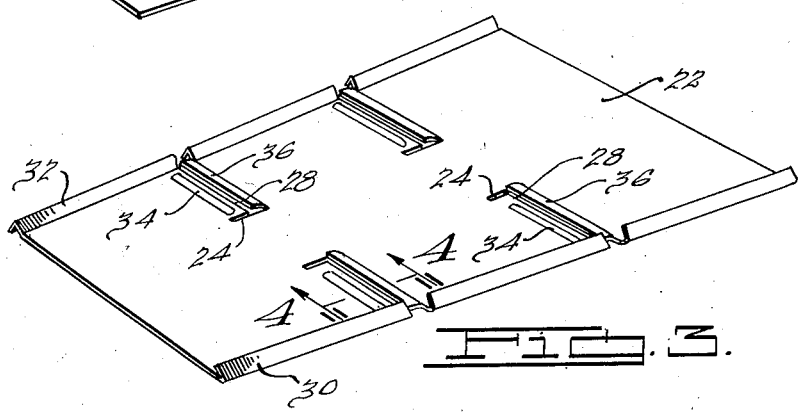
Fig. 3 is a perspective view showing the next step in the method of making the cover.
Figure 4:
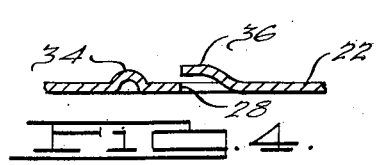
Fig. 4 is a fragmentary sectional view taken along line 4—4 of Fig. 3.

At the next station the blank may be slit between each aperture 24 and the adjacent notch 26 on lines 28 as shown in Fig. 3. Locking flanges 30 and 32 may also be formed at this time, if desired, and, as shown in Fig. 3, the flange 30 is formed along a line coinciding with the bottom edge of the notches 26 at one side edge of the blank 22, while the flange 32 is formed by folding the blank along a line coinciding with the bottom edge of the notches 26 formed at the other side edge of the blank 22 and along a line intersecting such notches 26. The slots 28 which extend between apertures 24 and notches 26 define free ended portions of the blank, a ridge 34 being formed parallel to and adjacent one of the free edges defined by each slit 28 and the other of the edges defining the slits 28 may be upset to define upwardly bent portions 36.

At the next operation the portions of the blank between the apertures 24 are folded to partially form folds or pleats 38 extended transversely of the blank, the upset portions 36 being drawn partially over the ridge 34 at this time as shown in Figs. 5 and 6.

The folds 38 are then further formed into loops 40 which are substantially symmetrical with respect to a vertical plane, the offset portions 36 being drawn completely over and into engagement with the ridges 34 at this time as shown in Figs. 7 and 8.

In the embodiment of the invention selected for purposes of illustration the completed spring casing is of one-piece construction and it is for this reason that the locking flanges 30 and 32 are formed along the side edges of the blank. After the transverse loops 40 are completely formed, the blank is folded longitudinally thereof along lines 42 to form portions 44 and 46 which together comprise the bottom wall 18 of the completed casing. The blank is then folded longitudinally along lines 48 which extend past the side edges of the folds 40 to define the side walls 16 and the top wall 14, the top wall 14 being of substantially the same width as the loops 40. When the casing is assembled on to a vehicle spring, the flange 30 is received between the angularly disposed portions of flange 32 and the seam thus formed is rolled over to form the lock seam 20 for securely clamping the casing on to the spring.

The casing may be provided with a liner of flexible material adapted to retain lubricant as is customary in the art or may be provided with an integral lubricant retaining liner of the kind shown in Jacobs Patent 2,604,-318. The particular type of liner which may be employed with my spring cover is of no particular importance as far as the present invention is concerned.

It is also to be understood that one of the walls of the casing may be provided with a slack take-up device formed therein of the type shown in Eisenhauer Patent 2,128,238. While the present casing is particularly suited for a one-piece construction as illustrated, it will be apparent that the casing may be made according to the principles of this invention and having only three sides rather than four and a separate cover might be employed for closing the fourth side of the spring.

The loops 40 form hinge portions which permit relative flexing between different sections of the completed cover when the same is locked on to a vehicle spring, and the overlapped portions of the remaining walls of the cover defined by the overlapped edges defining the slits 28 permit such flexing movement and at the same time prevent entry of moisture or dirt. The engagement of the offset edges 36 with the ridges 34 aids in sealing the interior of the casing from the entry of moisture and dirt.

The hinge construction formed by the loops 40 also permits longitudinal shifting of one section of the cover relative to another section thereof as well as the flexing movement previously described. Since the notches 26 formed at the side edges of the blank 22 interrupt the locking flanges 30 and 32, the various sections of the completed cover may readily flex and shift longitudinally relative to each other as the springs flex under varying load conditions.

While I have illustrated and described preferred embodiments of my invention, it is understood that this is capable of modification and I therefore do not wish to be limited to the precise details set forth but desire to avail myself of such changes and alterations as fall within the purview of the following claim.

I claim:

A spring cover comprising a sheet metal casing having a plurality of angularly disposed, longitudinally extending walls, one of said walls having a transverse fold in the form of a loop between its ends, the remainder of said walls being transversely slit throughout their widths to define relatively movable sections joined by said loop and overlapped free-ended portions in the remainder of said walls in line with said loop, said loop being formed to permit relative flexing and relative longitudinal movements of said sections, one of each pair of overlapped free ends having formed thereon a transversely disposed ridge and the other free end of said pair being adapted for overlapping engagement with said ridge during said relative flexing and longitudinal movements of said sections.

References Cited in the file of this patent

UNITED STATES PATENTS

| | | |
|---|---|---|
| 1,284,482 | Skok | Nov. 12, 1918 |
| 1,648,742 | Schlesser | Nov. 8, 1927 |
| 1,777,300 | Ferguson | Oct. 7, 1930 |
| 1,925,713 | Crist | Sept. 5, 1933 |
| 1,927,188 | Skinner | Sept. 19, 1933 |
| 1,946,391 | Cristman | Feb. 6, 1934 |
| 2,152,030 | Crabtree | Mar. 28, 1939 |